United States Patent [19]
Kirk et al.

[11] Patent Number: 4,459,489
[45] Date of Patent: Jul. 10, 1984

[54] GENERATOR LOAD RESPONSE CONTROL

[75] Inventors: Thomas E. Kirk, Anderson; Curtis D. Munden, Carmel; Leonard J. Sheldrake, Noblesville, all of Ind.

[73] Assignee: General Motors Corporation, Detroit, Mich.

[21] Appl. No.: 429,269

[22] Filed: Sep. 30, 1982

[51] Int. Cl.³ .............................. G05F 1/40; H02J 3/00
[52] U.S. Cl. ........................................ 290/13; 361/18; 322/8
[58] Field of Search .................. 290/7, 11, 12, 13, 51; 361/18, 21, 88, 165; 322/28, 36, 8; 320/64; 323/22; 317/36, 13 B; 219/202

[56] References Cited
U.S. PATENT DOCUMENTS

| | | | |
|---|---|---|---|
| 3,406,318 | 10/1968 | Harland, Jr. et al. | 361/18 |
| 3,469,168 | 9/1969 | Harland, Jr. et al. | 361/18 X |
| 3,597,654 | 8/1971 | Harland, Jr. | 317/13 B |
| 3,754,183 | 8/1973 | Ibamoto et al. | 323/22 SC |
| 4,263,543 | 4/1981 | Watrous et al. | 322/8 |

Primary Examiner—J. V. Truhe
Assistant Examiner—Terry Flower
Attorney, Agent, or Firm—C. R. Meland

[57] ABSTRACT

A voltage regulating system for a generator that supplies the battery and electrical loads on a motor vehicle. The system includes a load response control for detecting whenever a substantial electrical load is applied to the generator tending to cause a drop in generator output voltage and when such a condition is detected field current is controlled to gradually increase field current from some value. The load response control includes means for storing an electrical signal that corresponds to generator field current and for utilizing this stored value to set generator field current at a value corresponding to a field current that occurred just prior to the detected drop in voltage and then increasing field current slowly from this value. The system includes means for preventing a subsequent drop in detected load voltage from actuating the load response control for the time duration that field current is being slowly increased by the load response control once it has been triggered by an initial drop in voltage.

13 Claims, 3 Drawing Figures

GENERATOR LOAD RESPONSE CONTROL

This invention relates to a generator load response control and more particularly to a load response control for a diode-rectified alternating current generator that supplies the electrical loads on a motor vehicle including the vehicle battery.

The conventional electrical system of a motor vehicle includes an engine driven generator which supplies charging voltage to the motor vehicle battery and supplies the other electrical loads on the vehicle. The generator may take the form of a diode-rectified alternating current generator and the output voltage of the generator is controlled by a voltage regulator which senses generator output voltage and controls field current to maintain a desired regulated voltage for the system. As generator output voltage drops below the desired regulated value the regulator senses this condition and increases field current and when generator output voltage exceeds the desired regulated value field current is decreased. When a transistor voltage regulator is utilized the field current is switched on and off by a transistor connected in series with the field winding and the transistor switches in accordance with changes in sensed generator output voltage. When a substantial electrical load is switched on the generator output voltage will suddenly drop with the result that a conventional voltage regulator will sharply increase field current to increase generator output voltage toward the desired regulated value. This sharp increase in field current suddenly loads the generator and because of this imposes a suddenly increasing torque load on the engine with the result that the engine has a tendency to slow down. Where the engine is a small engine and is operating at idle speed under control of an idle speed control device a sudden increase in electrical load and the resultant response of a conventional voltage regulator can cause the engine to sharply slow down and perhaps even stall and in general adversely affects the control provided by the idle speed control system. Thus, the idle speed control may go into a hunting mode and vibration of the engine may occur.

It accordingly is one of the objects of this invention to provide a voltage regulating system for a generator which prevents the imposition of a sharply increasing torque load on the engine that drives the generator when an electrical load is applied to the generator. In carrying this object forward the system of this invention is capable of detecting a sudden drop in generator output voltage but instead of sharply increasing field current when this condition occurs the system gradually increases field current so as to gradually load the generator and bring its output voltage back up to the desired regulated value.

Another object of this invention is to provide a system of the type that has been described which includes means for sensing and storing a signal that corresponds to the amount of field current being supplied to the generator field during normal voltage regulator operation and when the sudden drop in generator output voltage is detected utilizing this stored information to set a field current value that is substantially equal to the field current that existed just prior to the detected drop in voltage and then increase field current slowly from that value for a period of time.

Still another object of this invention is to provide a system of the type that has been described wherein field current is pulse width modulated when the drop in system voltage is detected and is modulated such as to slowly increase average field current.

A further object of this invention is to provide a load response control of the type described which includes means for detecting the drop in system voltage and then slowly increasing field current from a predetermined level and wherein the control includes means for preventing re-triggering of the control by another drop in voltage for a time period during which field current is being slowly increased.

IN THE DRAWINGS

Figure 1:
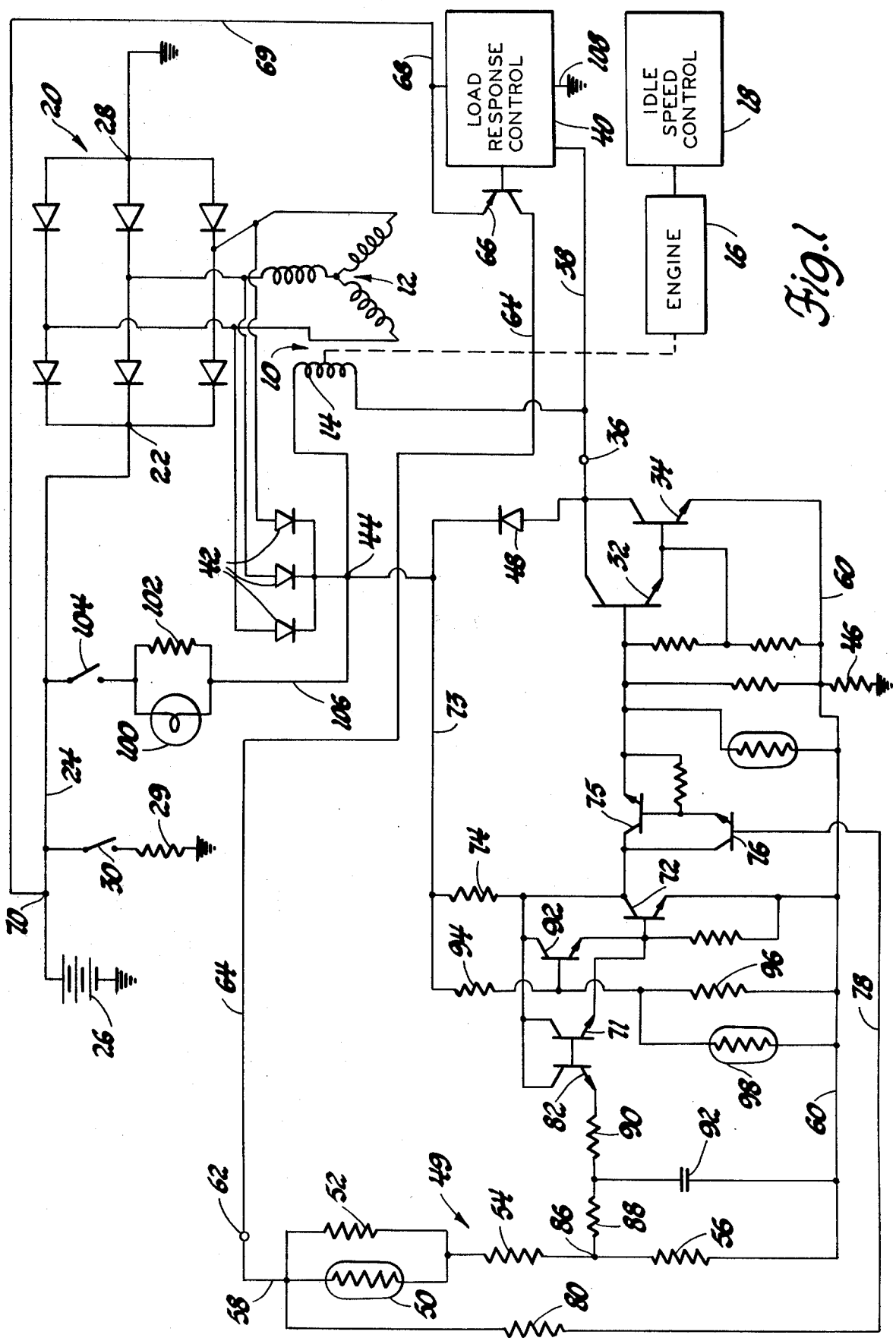
FIG. 1 is a schematic circuit diagram of an electrical system made in accordance with this invention.

Referring now to the drawings and more particularly to FIG. 1 the reference numeral 10 generally designates an alternating current generator which has a three phase Y-connected output winding 12 and a field winding 14. The field winding 14 is carried by the rotor of the generator in a conventional manner and is driven by a motor vehicle engine 16 via suitable pulleys and a generator drive belt. The electrical connections to opposite ends of the field winding are made by the usual brushes and slip rings. The engine 16 has its idle speed controlled by an idle speed control device which has been designated by reference numeral 18.

The output winding 12 of the generator is connected to a three phase full-wave bridge rectifier generally designated by reference numeral 20. The positive output terminal 22 of the bridge rectifier is connected to a conductor 24 which in turn is connected to the positive side of the motor vehicle battery 26. The negative output terminal 28 of the bridge rectifier is grounded as is one side of the battery 26. The reference numeral 29 designates an electrical load on the motor vehicle which is energized whenever the switch 30 is closed.

The voltage applied to conductor 24 and ground by bridge rectifier 20 is regulated to a desired regulated value, for example 14 volts in a 12 volt system, by a transistor voltage regulator of the type disclosed in the U.S. patent to Harland et al., U.S. Pat. No. 3,597,654. This regulator includes NPN transistors 32 and 34 connected in a Darlington configuration. The collectors of these transistors are connected to a junction 36 which in turn is connected to one side of field winding 14 and to a conductor 38 which is connected to a load response control circuit shown as a block in FIG. 1 and designated by reference numeral 40. The response control circuit will be described in detail hereinafter.

The field winding 14 is energized via a diode trio comprised of diodes 42 connected with the output winding 12. These diodes, together with three diodes of the bridge rectifier 20, serve to develop a direct field energizing voltage between junction 44 and ground. Thus, when transistors 32 and 34 are conducting the field winding 14 is energized via a circuit that can be traced from junction 44 through field winding 14, through the collector-emitter paths of transistors 32 and 34 and then through a smaller resistor 46 of approximately 0.02 ohms which is connected to ground. A field discharge diode 48 is connected across the field winding 14.

The voltage regulator has a voltage divider 49 comprised of a thermistor 50 paralleled by resistor 52, a resistor 54 and a resistor 56 connected in series between conductors 58 and 60. The conductor 60 is substantially at ground potential being connected thereto via previously mentioned small resistor 46. The conductor 58 is connected to a junction 62 which in turn is connected to conductor 64. The conductor 64 is connected in series with a PNP transistor 66 whose conduction is controlled by the response control circuit 40 to be described. The emitter of transistor 66 is connected to a conductor 68 which in turn is connected by conductor 69 to a junction 70 located near the positive terminal of the battery 26. When transistor 66 is conductive the voltage divider 49 of the voltage regulator is connected between junction 70 and ground so that it senses battery voltage and therefore the direct charging voltage applied to the battery by bridge rectifier 20.

The switching of the Darlington connected transistors 32 and 34 is controlled by a driver transistor switching stage comprised of Darlington connected transistors 71 and 72. The collectors of these transistors are connected to conductor 73 via a resistor 74 and conductor 73 is connected to junction 44. The collectors of transistors 71 and 72 are connected to the base of transistor 32 via Darlington connected transistors 75 and 76. When transistors 75 and 76 are conductive the collector voltage of transistor 72 is applied to the base of transistor 32 and when Darlington connected transistors 75 and 76 are nonconductive there is no base drive to transistors 32 and 34 with the result that they remain nonconductive to block field current. The base of transistor 76 is connected to conductor 78 which in turn is connected to conductor 58 via resistor 80. It will be appreciated from the foregoing that if transistor 66 is nonconductive it removes base drive from transistors 32 and 34 since the nonconduction of transistor 66 opens the base circuit to transistor 76 biasing this transistor and transistor 75 nonconductive. The same is true if the conductor 69, for some reason, should become disconnected from junction 70.

The driver transistors 71 and 72 switch on and off in accordance with the voltage sensed by voltage divider 49 to cause Darlington connected transistors 32 and 34 to switch on and off. Thus, when transistor 72 conducts it biases transistors 32 and 34 nonconductive and when transistor 72 is nonconductive it biases transistors 32 and 34 conductive. The emitter-base junction of NPN transistor 82 forms a Zener diode connected to the base of transistor 71. The emitter of transistor 82 is connected to a junction 86 on voltage divider 49 via series connected resistors 88 and 90. A capacitor 92 is connected between the junction of resistors 88 and 90 and conductor 60.

When the voltage sensed by voltage divider 49 exceeds a predetermined desired regulated value, for example 14 volts in a 12 volt system, the Zener diode comprised of the emitter-base junction of transistor 82 conducts biasing transistors 71 and 72 conductive. This biases transistors 32 and 34 nonconductive to break field circuit. When the voltage sensed by the voltage divider now drops below the desired regulated value the system operates to bias transistors 71 and 72 nonconductive which in turn biases transistors 32 and 34 conductive. The voltage regulator therefore causes transistors 32 and 34 to switch on and off to control the average field current supplied to field winding 14 to a value which operates to maintain the voltage between junction 70 and ground at some desired regulated value.

The transistor 92, resistors 94 and 96 and thermistor 98 provide an over-voltage protection circuit of the type disclosed in the above-mentioned U.S. patent to Harland et al., U.S. Pat. No. 3,597,654. The over-voltage protection circuit is connected to conductor 73 which senses the voltage appearing between junction 44 and ground and therefore diode trio voltage.

The system of FIG. 1 includes a signal lamp 100 connected in parallel with a resistor 102. The parallel connected signal lamp and resistor are connected in series with an ignition switch 104 and with conductor 106 that is connected to junction 44. The circuitry that has just been described provides for initial excitation of the field winding 14 from the battery and for an indication of low voltage output of the system in a manner well known to those skilled in the art.

Figure 2:
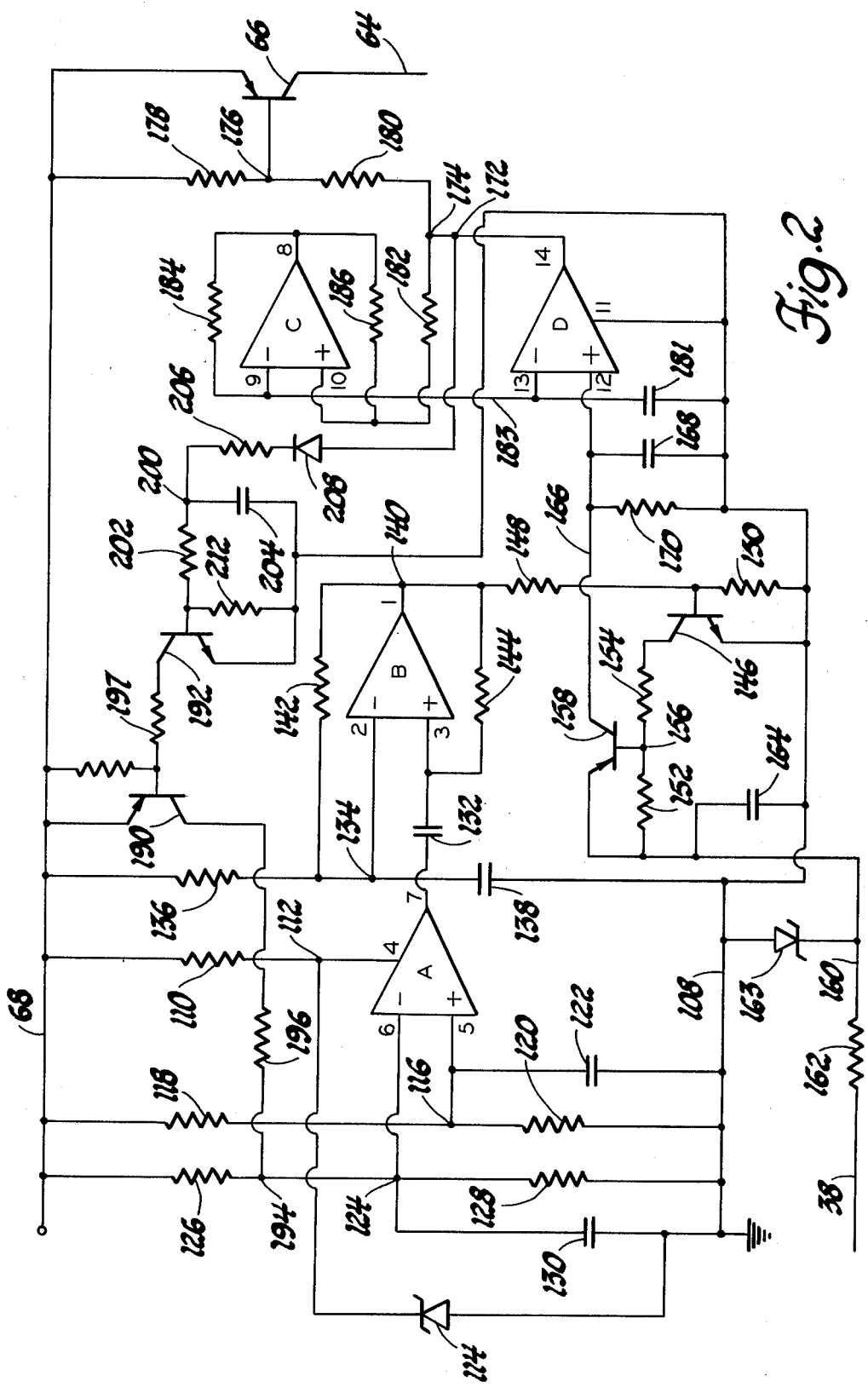
FIG. 2 is a schematic circuit diagram of a load response control shown in block diagram form in FIG. 1.

The load response control circuit which is shown as a block 40 in FIG. 1 is shown in detail in FIG. 2. The purpose of this load response control is to control field current whenever the control detects a sudden drop in voltage between junction 70 and ground indicative of the fact that a large electrical load has been applied to the generator with the result that under normal conditions this application of electrical load would tend to slow down the generator particularly when the engine is idling. The response control circuit detects this application of load and then slowly increases field current in order to raise the output voltage of the generator back toward the desired regulated value. The response control circuit is so arranged that it can detect the average current that is being supplied to the field winding when the system is being normally controlled by the voltage regulator. The response control stores a value representative of the average field current and when the load on the generator is suddenly increased it sets the field current to substantially the value that last occurred during normal operation of the voltage regulator and then slowly increases field current from this last detected and stored value. Thus, during normal operation of the voltage regulator the response control is continuously detecting and storing the value of field current that is being utilized to control generator output voltage.

In FIG. 2 the same reference numerals have been used as were used in FIG. 1 to identify corresponding parts. The response control circuit of FIG. 2 has a conductor 108 which is grounded. The conductor 68, shown in FIGS. 1 and 2, is connected to positive battery voltage. The circuit of FIG. 2 utilizes a single package quad operational amplifier comprised of operational amplifiers designated by the letters A, B, C and D. The operational amplifiers are of the National Semiconductor LM-324N type. The terminal 4 of operational amplifier A is connected to conductor 68 by a resistor 110. The junction 112 is connected to terminal 4 of amplifier A and the other amplifiers are likewise connected to junction 112 for supplying power thereto by electrical connections not illustrated. Amplifier D has its terminal 11 connected to the ground conductor 108 and the other amplifiers shown in FIG. 2 have terminals connected to ground by circuitry not illustrated. A Zener diode 114 is connected between junction 112 and ground. This Zener diode is a protective device for high voltage conditions and may have, for example, an 18 volt break down rating. The operational amplifier A operates as a comparator and is part of a circuit for detecting a sudden drop in system voltage indicative of the application of a suddenly increasing electrical load to the generating system. The positive terminal of amplifier A is connected to a junction 116 located between resistors 118 and 120. These resistors may have equal values of approximately 1 megohm. A capacitor 122 of approximately 1 microfarad is connected across resistor 120. The negative terminal of amplifier A is connected to a junction 124 located between resistors 126 and 128. A capacitor 130 of approximately 0.047 microfarads is connected in parallel with the resistor 128.

The voltage at junction 116 depends on the output voltage of the system since resistors 118 and 120 are in effect connected across battery 26. Thus, during normal operation of the voltage regulator the capacitor 122 will be charged to some voltage which is approximately ½ system voltage. The resistor 126 may be, for example, 15.9 K-ohms and the resistor 128 is approximately 17.8 K-ohms. The junction 124, during operation of the voltage regulator, will also be at some potential due to the voltage divider provided by resistors 126 and 128. The circuitry and the component values thereof are arranged such that when the voltage on conductor 68 drops by a predetermined amount the voltage at junction 124 decreases relative to the voltage at junction 116 by an amount sufficient to cause amplifier A to develop an output at its terminal 7. In this regard, with the relative component values as set forth above the voltage at junction 124 will decrease at a faster rate than the voltage at junction 116. To summarize, the circuitry that has been described, including amplifier A, operates to detect a drop in load voltage indicative of the application of a substantial electrical load to the system.

The output of amplifier A is coupled to the positive terminal of amplifier B ay a 100 picofarad capacitor 132. The negative terminal of amplifier B is connected to junction 134 and this junction is connected to conductor 68 via resistor 136. A 0.01 microfarad capacitor 138 is connected between junction 134 and ground. The output terminal 1 of amplifier B is connected to a junction 140 and this junction is respectively connected to the negative and positive input terminals of amplifier B by a 1 megohm resistor 142 and a 3.3 megohm resistor 144. The amplifier B and connected circuitry operates as a one-shot monostable multivibrator having an output pulse duration which is determined by the RC time constant of resistor 142 and capacitor 138. Whenever amplifier A is triggered by a drop in system voltage it triggers the one-shot monostable multivibrator comprised of amplifier B and a voltage pulse of a predetermined duration is temporarily developed at junction 140 for the time period of the one-shot monostable multivibrator.

The junction 140 is coupled to the base of NPN transistor 146 via resistor 148. A resistor 150 connects the base of transistor 146 to grounded conductor 108. The collector of transistor 146 is connected in series with resistors 152 and 154 having a junction 156 connected to the base of transistor 158. The emitter of transistor 158 is connected to a conductor 160 which in turn is connected in series with resistor 162. A 10 microfarad capacitor 164 connects conductor 160 to ground and a protective Zener diode 163 (18 volt break down) is connected between conductor 160 and ground.

The collector of transistor 158 is connected to a conductor 166 which in turn is connected to the positive terminal of amplifier D. A 1 microfarad capacitor 168 is connected between conductor 166 and ground and is paralleled by a 2.7 megohm resistor 170.

The purpose of the circuitry that has just been described is to develop a voltage on capacitor 168 which is a function of the average current supplied to field winding 14 during normal operation of the voltage regulator. This voltage is subsequently used to control pulse width modulation of the field current for field winding 14 when a sudden drop in load voltage is detected. The capacitor 164 is connected across the collector and emitter of the field controlling switching transistor 34 via conductor 160, resistor 162 and conductor 38 and junction 36. Thus, as transistor 34 conducts the capacitor can discharge therethrough. During time periods when transistor 34 is nonconductive the capacitor is charged via resistor 162. The capacitor 164 therefore attains a voltage which is related to the average value of field current supplied to field winding 14 since the transistor 34 is continuously switching on and off to control field current and as this switching occurs the voltage at junction 36 respectively increases and decreases.

When the amplifier A and associated circuitry detects a sudden drop in load voltage to trigger the one-shot multivibrator, including amplifier B, the voltage at junction 140 goes high to bias transistor 146 conductive. This in turn biases transistor 158 conductive and the voltage stored in capacitor 164, which represents average field current, now is dumped into capacitor 168 to charge this capacitor to a value representative of the average field current that was being supplied to the field winding 14. The voltage on capacitor 168 is now utilized to pulse width modulate field current by causing transistor 66 to switch on and off to thereby cause transistors 75 and 76 to switch on and off which in turn results in switching transistors 32 and 34 on and off. The amplifiers C and D are part of a circuit that pulse width modulates the conduction of transistor 66 at a variable duty cycle and constant frequency of, for example, 300 cycles per second. It can be seen that the voltage on capacitor 168 is applied to the positive terminal of amplifier D and the output of this amplifier is connected to junctions 172 and 174. The junction 174 is connected to junction 176 located between resistors 178 (2.2K) and 180 (10K) and junction 176 is connected to the base of transistor 66. The junction 174 is further connected to the positive terminal of amplifier C via a 10K resistor 182 and amplifier C is connected with resistors 184 (68K) and 186 (1K) in a manner illustrated in FIG. 2. The negative terminals of amplifiers C and D are connected to one side of a 0.01 microfarad capacitor 181 by conductor 183. The opposite side of capacitor 181 is grounded.

As previously mentioned, amplifiers C and D and associated circuitry form a pulse width modulating circuit having a substantially constant frequency and variable duty cycle. Amplifier C, in conjunction with capacitor 181 and resistor 184, form an oscillator which when energized causes the voltage at the negative terminal of amplifier D to ramp up and down at the oscillator frequency. During this mode of operation and assuming no charge on capacitor 168 the average voltage of the negative terminal (terminal 13) of amplifier D maintains the output of amplifier D low so as to bias transistor 66 conductive. This is the normal mode of operation where no sudden drop in load voltage has occurred. When a sudden drop in load voltage is detected capacitor 168 is charged to a voltage level indicative of the value of field current at the instant that the sudden voltage drop occurred. Amplifier D is now temporarily biased to develop a high output which is applied to junctions 172 and 174. This biases transistor 66 nonconductive which in turn biases voltage regulator transistors 32 and 34 nonconductive. As the voltage on terminal 13 of amplifier D ramps up and down its voltage relative to the voltage on terminal 12 provided by capacitor 168 now causes the output of amplifier D to be pulse width modulated, that is, the pulse width of the period that the output of amplifier D is low to bias transistor 66 and consequently regulator transistors 32 and 34 conductive is varied. The duty cycle or on time of transistors 32 and 34 is determined by the voltage on capacitor 168 so that initially average pulse width modulated field current will start out at substantially the same value that occurred just prior to the sudden drop in load voltage. As the system now pulse width modulates transistor 66, and therefore transistors 32 and 34, the capacitor 168 discharges through resistor 170. As capacitor 168 discharges the duty cycle or on time of transistors 32 and 34 is slowly increased up to approximately 100% duty cycle when capacitor 168 has completely discharged. This, of course, results in the output voltage of the generator being gradually increased so as to not unduly overload the engine 16. After capacitor 68 has completely discharged the system reverts back to normal operation in which transistor 66 is biased conductive and in which field current is controlled by the voltage regulator. In summary, transistor 66 is normally biased conductive to permit normal voltage regulator operation but becomes pulse width modulated whenever a sudden drop in load voltage is detected.

The load response control of FIG. 2 includes circuitry for preventing the re-triggering of amplifiers A and B once amplifier A has been biased to a condition developing an output voltage by a drop in load voltage. This circuitry includes transistors 190 and 192. The collector of transistor 190 is connected to junction 194 by a resistor 196. The base of transistor 190 is connected to the collector of transistor 192 via resistor 197. The base of transistor 192 is connected to junction 200 via resistor 202 and its emitter is grounded. A capacitor 204 is connected between junction 200 and ground. The junction 200 is connected to junction 172 by resistor 206 and diode 208.

During pulse width modulation of transistor 66 the voltage at junction 172 increases and decreases at the frequency of the pulse width modulation. When the voltage at junction 172 goes high capacitor 204 is charged. The voltage on capacitor 204 biases transistors 192 conductive which in turn biases transistor 190 conductive. When transistor 190 conducts the voltage of junction 194 is increased to a point that will prevent triggering of operational amplifier A by a subsequent drop in system voltage during the period of time that transistor 66 is being pulse width modulated. The capacitor 204 will eventually discharge through resistors 202 and 212 when the pulse width modulating signal at junction 172 ceases at the end of the pulse width modulating mode of operation. In summary, the circuitry that has just been described operates to prevent a re-triggering of operational amplifiers A and B once they have been triggered by a sudden drop in system voltage for a period of time corresponding to pulse width modulation of transistor 66 which ceases when capacitor 168 becomes completely discharged.

Figure 3:
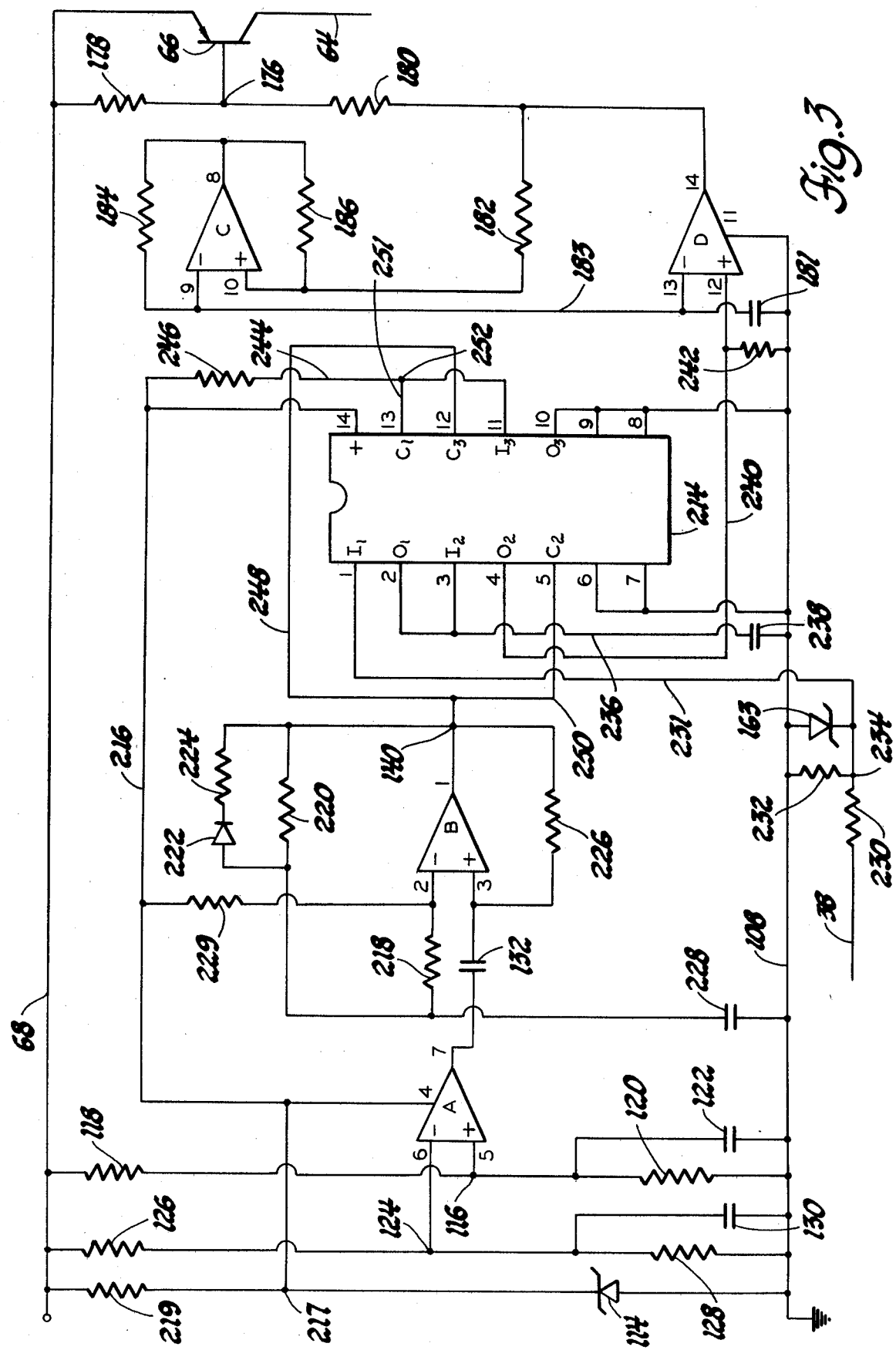
FIG. 3 is a schematic circuit diagram of a modified load response control.

Referring now to FIG. 3, a modified load response control circuit is illustrated which generally performs the same function as the load response circuit shown in FIG. 2. In FIG. 3 the same reference numerals have been used to identify parts corresponding to the parts illustrated in FIGS. 1 and 2. In general the circuit of FIG. 3 eliminates certain discrete transistors and utilizes a quad bilateral monolithic silicon semiconductor switch, for example a RCA type CD-4066 quad bilateral switch. This device is identified by reference numeral 214 in FIG. 3.

The terminal pins for this device are identified in FIG. 3 and the device contains for individual bilateral semiconductor switches the conduction of each of which is controlled by respective bias voltages applied to respective control terminals which causes two other terminals of a switch to be electrically connected or disconnected. Thus, terminals 1 and 2, also identified by legends $I_1$ and $O_1$, form the input and output terminals for one bilateral switch and its control terminal $C_1$ is terminal number 13. Another bilateral switch is connected to input and output terminals 11 and 10 which are also identified as $I_3$ and $O_3$ and this switch has a control terminal 12 which is further identified as $C_3$. Another bilateral switch of the device has input and output terminals 3 and 4 also identified as $I_2$ and $O_2$ and a control terminal 5 further identified as $C_2$. The fourth bilateral switch in the package is not utilized in the circuit of FIG. 3 and it has input and output terminals 8 and 9 and a control terminal 6. The terminals 8 and 9 of that bilateral switch are grounded as is the control terminal 6 for that switch. Terminal 7 is an input terminal for the entire device which is grounded and terminal 14 is a positive voltage input for the entire device which is connected to conductor 216. Conductor 216 is connected to junction 217 and this junction is connected to conductor 68 by a 1K resistor 219.

The load response circuit of FIG. 3 has the same pulse width modulating device as that of FIG. 2 which is comprised of amplifiers C and D and has the same voltage detecting circuit comprising amplifier A. The one-shot or monostable multivibrator is modified from that shown in FIG. 2 and comprises the amplifier B. Thus, the negative terminal of amplifier B is connected to a 100K resistor 218 which in turn is connected to a 1.2 megohm resistor 220 the opposite side of which is connected to the output terminal of amplifier B. The resistor 220 is shunted by a diode 222 and a resistor 224 of approximately 1000 ohms. A resistor 226 of approximately 100K ohms connects the positive terminal of amplifier B to the output terminal. The capacitor 228 in FIG. 3 is approximately one microfarad. A 4.7 megohm resistor 229 connects the negative terminal of amplifier B to conductor 216.

The conductor 38, which is connected to the collector of the voltage regulator switching transistor 34, is connected in series with a 100K resistor 230 and the opposite side of this resistor is connected to conductor 231 which in turn is connected to terminal 1 of the quad bilateral switch 214. A 150K resistor 232 is connected between junction 234 and ground. The resistors 230 and 232 form a voltage divider for the voltage applied between conductor 38 and ground from junction 36.

The terminals 2 and 3 of bilateral switch 214 are connected to a conductor 236. A capacitor 238, for example of one microfarad, is connected between conductor 236 and ground. The positive terminal of amplifier D is connected to conductor 240 which in turn is connected to terminal 4 of device 214 and to one side of a 1.2 megohm resistor 242 the opposite side of which is grounded. Terminals 11 and 13 of device 214 are connected to a conductor 244. A 10K resistor 246 connects conductor 216 and conductor 244. The terminal or junction 140 connected to the output of amplifier B is connected to conductors 248 and 250 which are respectively connected to terminals 12 and 5 of device 214.

The operation of the load response circuit shown in FIGS. 3 will now be described. If it is assumed that the voltage regulator is normally controlling the output of the generator, and that no sudden drop in voltage has occurred, the voltage at junction 36 increases and decreases as the switching device 34 of the regulator switches on and off. At this time the capacitor 238 is charged from junction 234 via conductor 231 and the bilateral switch that now connects terminals 1 and 2 of device 214 and line 236. The bilateral switch connected to terminals 1 and 2 is now conductive since its control electrode 13 has a voltage applied thereto from conductor 216 via resistor 246 to bias this bilateral switch conductive. The voltage on capacitor 238 now attains a value that corresponds to the frequency and duration of the consecutive on and off times of the voltage regulator switching device 34. The capacitor 238 thus performs the same function as capacitor 164 of FIG. 2 with the exception that a switch has now been interposed between the conductor 38 and the capacitor to control the charging circuit for the capacitor.

Assuming now that a sudden voltage drop occurs between conductor 24 and ground, the amplifier A is triggered to apply a signal to the positive terminal of amplifier B. The amplifier B, which is part of a one-shot multivibrator, now causes a square wave pulse of predetermined duration to be applied to its output terminal and therefore applied to both conductors 248 and 250. The voltage applied to conductor 248 is applied to the terminal 12 which controls the bilateral switch controlling the connection of terminals 10 and 11. The bias is such that the bilateral switch now electrically connects terminals 11 and 10 and since terminal 10 is grounded it effectively electrically connects control terminal 13 to ground via conductor 251 and junction 252. Terminal 13 is the control terminal for the bilateral switch that controls the connection of terminals 1 and 2 and since terminal 13 is grounded terminals 1 and 2 are now electrically disconnected to, in effect, disconnect the conductor 38 from capacitor 238 to thereby open the charging circuit to this capacitor. At the same time the square wave voltage applied to conductor 250 biases control terminal 5 such that terminals 3 and 4 are now electrically connected by a bilateral switch. Capacitor 238 can now discharge via conductor 236 to terminal 3 through the bilateral switch to terminal 4 and through conductor 240 and resistor 242 to ground. The capacitor voltage is immediately applied to the positive terminal of amplifier D to control the pulse width of the pulse width modulator. Thus, field current is set initially to some value corresponding to the charge on capacitor 238 and the on time or pulse width of the voltage regulating transistor switch 34 is gradually increased as the capacitor 238 discharges through resistor 242. This mode of operation continues until the capacitor 238 has completely discharged.

In the circuit of FIG. 2 the transistors 190 and 192 and associated circuitry were utilized to prevent re-triggering of the control to a pulse width modulating mode once amplifier A was triggered by a drop in load voltage. The system of FIG. 3 performs this same general function but in a different manner. Thus, in the system of FIG. 3 the time constant of resistor 220 and capacitor 228 must be equal to or larger than the time constant of capacitor 238 and resistor 242. Thus, the duration of the output pulse of the one-shot multivibrator that includes amplifier B is determined by the RC time constant of resistor 220 and capacitor 228. This pulse duration must be long enough to permit complete discharge of capacitor 238 through resistor 242 when the control has been triggered to the pulse width modulating mode. With this constraint on the system the circuit cannot be re-triggered by another drop in load voltage during the duration of the output pulse of the one-shot multivibrator, including amplifier B.

In summary, and in regard to the circuit of FIG. 3, the circuit performs the same general function as the circuit of FIG. 2. It uses a low cost device 214, however, and also has eliminated the capacitor 164 of FIG. 2. Further, the function of preventing re-triggering of the circuit once a sudden drop in voltage has been detected is accomplished by setting the pulse duration of the one-shot multivibrator including amplifier B such that it exceeds or is substantially equal to the time constant of capacitor 238 and resistor 242.

The load response control is only actuated to pulse width modulate field current when a moderate to heavy electrical load is switched on, some examples being the vehicle high beam headlights, back window heater, the electric motor driven radiator cooling fan and high speed energization of the electric motor that drives the heater blower. This is accomplished by arranging the voltage drop detecting circuit including amplifier A such that it only develops an output when the voltage it detects drops by a predetermined amount for example 0.5 volts. The amount of voltage drop that will trigger the control can be varied to suit the particular electrical system on the vehicle. The trigger level selected will determine which vehicle electrical loads will cause the control to be actuated when switched on.

The time period that field current is gradually increased by pulse width modulation when a drop in load voltage is detected can be varied to provide the desired rate of increase of field current. In the circuit of FIG. 2 this time period is determined by the time required for capacitor 168 to completely discharge through resistor 170 and in FIG. 3 by the time required for capacitor 238 to completely discharge through resistor 242. The time period in the FIG. 2 circuit is about 2.7 seconds and in the FIG. 3 circuit about 2 seconds. The rate at which field current is increased is determined by the RC discharge curve of the respective RC circuits. In the event that pulse width modulation of field current increases load voltage above the set desired regulated value before, for example, capacitor 238 of FIG. 3 has completely discharged the voltage regulator will bias transistors 32 and 34 temporarily nonconductive since driver transistor 72 will be biased conductive to interrupt field current and therefore decrease load voltage back to the desired regulated value. Field current will be switched back on when load voltage drops below the desired regulated value provided transistors 75 and 76 are biased conductive.

It will of course be appreciated that when a voltage drop occurs, of sufficient magnitude to trigger the voltage detector circuit including amplifier A, the transistor 72 of the voltage regulator will be biased nonconductive since the voltage sensed by the regulator will now be below the regulator set point corresponding to the desired regulated value. Transistor 72 remains nonconductive until load voltage exceeds the desired regulated value. With transistor 72 nonconductive its collector voltage is high and accordingly the switching of transistors 75 and 76 by the pulse width modulator will cause transistors 32 and 34 to switch on and off to thereby pulse width modulate field current.

The capacitor 164 in FIG. 2 and the capacitor 238 in FIG. 3 operate as storage devices. When regulator switching transistor 34 is nonconductive the capacitor is charged or incremented and when transistor 34 is conductive the capacitor discharges through transistor 34 and is therefore decremented. The voltage on the capacitor therefore represents average field current and is continuously updated as the load on the generator varies.

As previously mentioned, when pulse width modulation of field current is called for, in response to a drop in load voltage, field current is initially set at a value that is substantially the same as that which occurred when the drop in voltage occurs. This has the advantage of neither under or over loading the engine since field current is gradually increased from a value that already existed when the drop in voltage occurred. Further, by use of this arrangement a droop in output voltage will not occur as compared to a system that would always initially set field current to some low fixed value and increase field current from that value.

The resistance of the switches of quad bilateral switch 214, utilized in the circuit of FIG. 3, is approximately 80 ohms when a switch is biased conductive.

In the foregoing description of the invention specific values have been given for various resistors and capacitors. The values are given by way of example and can be varied to suit the requirements of the system.

The embodiments of the invention in which an exclusive property or privilege is claimed are defined as follows:

1. A voltage regulating system for an electrical generator having a field winding that is operative to control field current to maintain a regulated generator output voltage and to control the rate of increase of field current when an electrical load of at least a predetermined magnitude is applied to the generator comprising, field current control means connected to said field winding for varying field current, voltage responsive means connected to sense generator output voltage and to said field current control means for varying field current as a function of the output voltage of the generator to thereby maintain the generator output voltage at a desired regulated value, means for developing and storing a control signal the magnitude of which is a function of the current being supplied to the field winding during control by said voltage responsive means, and means responsive to a decrease in output voltage of said generator of at least a predetermined magnitude for varying field current in such a manner as to gradually increase field current and thereby increase generator output voltage toward said regulated value, said last-named means including means operative to initially set field current to a value substantially corresponding to a magnitude represented by said stored control signal and gradually increasing field current from that value.

2. A voltage regulating system for a generator having an output winding and a field winding comprising, voltage responsive means connected to said output winding and coupled to field current control means for controlling field current to maintain a desired regulated generator output voltage, storage means coupled to said field current control means for developing and storing an electrical signal the magnitude of which is indicative of the magnitude of field current supplied to said field winding, voltage detector means coupled to said output winding of said generator for detecting a drop in generator output voltage, and load response control means responsive to detection of said drop in voltage for setting field current to a value corresponding to said stored electrical signal and gradually increasing field current from that value for a predetermined time period, said load response control means including means for decrementing the stored electrical signal at a predetermined rate, the field current gradually increasing as said stored electrical signal is decrementing and said system returning to control by said voltage responsive means when said electrical signal has been completely decremented.

3. A voltage regulating system for a generator having an output winding and a field winding comprising, means for detecting the magnitude of the output voltage of said generator, field current control means coupled to said last-named means for controlling field current as a function of the output voltage of the generator to thereby maintain a desired regulated voltage, said field current control means comprising switching means connected in series with said field winding, a capacitor, means coupled to said switching means for charging the capacitor to a voltage which is a function of the average current supplied to said field winding, voltage detecting means coupled to the output winding of said generator for detecting a drop in generator output voltage indicative of the application of an electrical load to the generator, and means responsive to the detection of said drop in voltage operative to permit said capacitor to discharge at a predetermined rate and for setting field current to a value that is a function of the voltage attained by the capacitor when the drop in voltage occurred, said last-named means gradually increasing field current in response to discharge of said capacitor.

4. A voltage regulating system for a generator having an output winding and a field winding comprising, voltage responsive means coupled to output winding of the generator and to field current control means for varying field current as a function of generator output voltage to thereby maintain the output voltage at a desired regulated value, means connected to said generator for detecting a drop in generator output voltage indicative of the application of an electrical load to the generator, control means responsive to the detection of said drop in voltage for setting field current to a predetermined value and then gradually increasing field current from that value for a time period, and means for preventing operation of said control means by a subsequent drop in generator voltage while field current is being slowly increased for said time period.

5. A voltage regulating system for a generator having an output winding and a field winding comprising, voltage responsive means coupled to the output winding of said generator and to field current control means for varying field current as a function of generator output voltage to thereby maintain the output voltage at a desired regulated value, voltage detector means for detecting a drop in generator output voltage indicative of the application of an electrical load to the generator, means responsive to the detection of said drop in voltage for setting field current to a predetermined value and then gradually increasing field current from that value for a time period, and means for disabling said voltage detector means when field current is being slowly increased for said time period.

6. An electrical system for controlling the output voltage of a generator having an output winding and a field winding comprising, voltage regulating means including transistor switching means connected to said field winding for controlling average field current, said transistor switching means being coupled to means responsive to the output voltage of the generator so as to control the transistor switching means in accordance with the voltage sensed, voltage drop detecting means coupled to the output winding of the generator for detecting a drop in generator output voltage, and pulse width modulator control means operative to control average field current as a function of pulse width when said voltage drop detecting means detects a drop in voltage of a predetermined magnitude, said pulse width modulator control means including means for setting pulse width initially to a value that provides a predetermined average field current and is then operative to gradually increase pulse width to thereby gradually increase average generator field current.

7. A voltage regulating system for a diode-rectified alternating current generator which supplies the electrical loads on a motor vehicle comprising, an alternating current generator having an output winding and a field winding, rectifier means connected to said output winding and to power supply conductors for feeding the electrical loads on the motor vehicle including the vehicle battery, a voltage regulator sensing the voltage across said power supply conductors and including transistor switching means connected in series with said field winding for controlling field current so as to maintain a substantially constant desired regulated voltage across the power supply conductors, voltage detector means connected across said power supply conductors for detecting a drop in voltage, a pulse width modulating control means, means responsive to the detection of said drop in voltage for setting said pulse width modulating control means into operation, means coupling said pulse width modulating control means to said transistor switching means such that said transistor switching means is switched in accordance with a pulse width produced by said pulse width modulating means, and means for causing the pulse width of said pulse width control means to gradually increase for a predetermined time period once it is set into operation to thereby gradually increase average generator field current.

8. A motor vehicle electrical system comprising, a generator driven by the engine of the vehicle having an output winding and a field winding, power supply conductors connected with said generator for feeding the electrical loads on the motor vehicle including the vehicle battery, voltage regulating means sensing the output voltage across said power supply conductors and coupled to said field winding for controlling field current so as to maintain a voltage of a desired regulated value across said power supply conductors, means for detecting a drop in voltage across said power supply conductors indicative of the application of an electrical load to said power supply conductors, and means responsive to the detection of said voltage drop for setting field current to a predetermined value and then slowly increasing field current from that value whereby a sharply increasing torque load is not applied to the engine.

9. An electrical system for controlling the output voltage of a generator having an output winding and a field winding comprising, a field circuit for energizing said field winding from said generator output winding comprising a semiconductor switching means connected in series with said field winding, voltage responsive means coupled to said output winding and to said semiconductor switching means for causing said semiconductor means to switch on and off in accordance with generator output voltage to thereby control average field current, a capacitor, a first switching means operative to connect said capacitor across said semiconductor switching means such that the capacitor can charge during time periods when the semiconductor switching means is nonconductive whereby the capacitor attains a charge that is a function of average field current, a second switching means, load response control means connected to said semiconductor switching means for at times controlling the duration of the time period that the semiconductor switching means is biased conductive as a function of capacitor voltage, said time period during inversely related to capacitor voltage, a resistor, and means responsive to a drop in generator output voltage of a predetermined magnitude for opening said first switching means and for actuating said second switching means to connect said capacitor to said load response control means and to said resistor to discharge the capacitor through the resistor.

10. An electrical system for controlling the output voltage of a generator having an output winding and a field winding comprising, a field circuit for energizing said field winding from said generator output winding comprising semiconductor switching means connected in series with said field winding, voltage responsive means coupled to said output winding and to said semiconductor switching means for causing said semiconductor switching means to switch on and off in accordance with generator output voltage to thereby control average field current, first and second capacitors, means connecting said first capacitor across said semiconductor switching means such that said first capacitor can charge during time periods when the semiconductor switching means is nonconductive whereby said first capacitor attains a charge that is a function of average field current, load response control means connected to said semiconductor switching means for at times controlling the duration of the time period that the semiconductor switching means is biased conductive as a function of the voltage on said second capacitor, said time period being inversely related to the voltage of said second capacitor, a resistor, means connecting said resistor across said second capacitor, and means responsive to a drop in generator output voltage of a predetermined magnitude for discharging said first capacitor into said second capacitor whereby said load response control means is controlled by the voltage on said second capacitor and said second capacitor discharges through said resistor.

11. An electrical system for controlling the output voltage of a generator having an output winding and a field winding comprising, voltage regulating means having output transistor switching means connected in series with said field winding and having driver transistor switching means coupled to respond to the output voltage of said generator, a switching device so connected between said driver transistor switching means and said output transistor switching means that said output transistor switching means is controlled by said driver transistor switching means when said switching device is conductive and said output transistor switching means is biased non-conductive whenever said switching device is non-conductive, pulse width modulating control means coupled to said switching device for at times controlling the operation of said switching device, means responsive to a drop in output voltage of said generator of a predetermined magnitude for causing said pulse width modulating control means to switch said switching device on and off, said last-named means operative when said voltage drop occurs to control the switching of said switching device such that said output transistor switching means is switched in a manner to gradually increase average field current from a predetermined value.

12. An electrical system for controlling the output voltage of a generator having an output winding and a field winding comprising, voltage regulating means coupled to said output winding and field winding for controlling field current as a function of generator output voltage, said regulating means including switching means connected in series with said field winding that is actuated conductive when generator output voltage is below a desired regulated value and nonconductive when generator output voltage is above the desired regulated value, means coupled to said voltage regulating means for developing and storing an electrical control signal the magnitude of which is a function of average field current, said last-named means including means to increment said control signal when said switching means is in one state and decrement said control signal when said switching means is in an opposite state, and means responsive to a drop in generator voltage to a value below said desired regulated value for setting field current to a value corresponding to said stored control signal and then gradually increasing field current from that value to thereby raise the generator output voltage toward said desired regulated value.

13. A motor vehicle electrical system for supplying electrical loads on the vehicle wherein the vehicle engine drives a generator having a field winding an an output winding and wherein the system is arranged to prevent a sharply increasing torque load from being applied to the engine by the generator when an electrical load is applied to the output winding of the generator comprising, voltage regulating means coupled to said output winding and to said field winding for controlling field current as a function of generator output voltage to thereby maintain the output voltage at a desired regulated value, and load control means coupled to said field winding and responsive to a decrease in generator output voltage indicative of the application of an electrical load of at least a predetermined magnitude to the generator output winding for gradually increasing field current from substantially a value that existed when said drop in voltage occurred whereby generator output voltage is increased toward said desired regulated value and the torque load applied to the engine by the generator is gradually increased.

* * * * *